(12) United States Patent
Nagaraju et al.

(10) Patent No.: US 10,942,377 B2
(45) Date of Patent: Mar. 9, 2021

(54) HIGH SWING AC-COUPLED MACH-ZEHNDER INTERFEROMETER (MZI) DRIVER

(71) Applicant: Cisco Technology, Inc., San Jose, CA (US)

(72) Inventors: Manohar Bhavsar Nagaraju, Norristown, PA (US); Sean P. Anderson, Macungie, PA (US); Alexander Christopher Kurylak, Bethlehem, PA (US); Kadaba Lakshmikumar, Basking Ridge, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/154,127

(22) Filed: Oct. 8, 2018

(65) Prior Publication Data

US 2020/0110290 A1 Apr. 9, 2020

(51) Int. Cl.
*G02F 1/01* (2006.01)
*H04B 10/556* (2013.01)
(Continued)

(52) U.S. Cl.
CPC .......... *G02F 1/0123* (2013.01); *G02F 1/2257* (2013.01); *H04B 10/541* (2013.01); *H04B 10/5561* (2013.01); *G02F 2001/212* (2013.01)

(58) Field of Classification Search
CPC ................. G02F 1/0123; G02F 1/2257; G02F 2001/2122; H04B 10/541; H04B 10/5561
See application file for complete search history.

(56) References Cited

U.S. PATENT DOCUMENTS

| 5,400,417 A * | 3/1995 | Allie ..................... G02F 1/0123 |
| | | 359/245 |
| 5,767,739 A * | 6/1998 | Witte ..................... H04S 1/007 |
| | | 329/306 |

(Continued)

OTHER PUBLICATIONS

Snoddy et al, Stabilization of electro-optic modulator bias voltage drift using a lock-in amplifier and a proportional-integral-derivative controller in a distributed Brillouin sensor system, Applied Optics, V. 46, N. 9, 2007 (Year: 2007).*

(Continued)

*Primary Examiner* — Peter Radkowski
(74) *Attorney, Agent, or Firm* — Edell, Shapiro & Finnan, LLC

(57) ABSTRACT

A driver circuit for a Mach-Zehnder modulator is provided that includes a first driver having an input to receive one of an input data or input data complement, and an output to be coupled to a first application voltage node associated with a first arm of a Mach-Zehnder modulator. The driver circuit includes a second driver having an input to receive the other of the input data complement or input data, and an output to be coupled to a second application voltage node associated with the first arm of the Mach-Zehnder modulator. The first driver and the second driver differentially drive the first and second application voltage nodes associated with the first arm of the Mach-Zehnder modulator to result in a voltage swing associated with a voltage applied to the first arm that is twice the supply voltage.

20 Claims, 8 Drawing Sheets

(51) Int. Cl.
*G02F 1/225* (2006.01)
*H04B 10/54* (2013.01)
*G02F 1/21* (2006.01)

(56) References Cited

U.S. PATENT DOCUMENTS

| | | | | |
|---|---|---|---|---|
| 6,621,617 | B1* | 9/2003 | Poggiolini | G02F 1/225 |
| | | | | 359/237 |
| 6,671,079 | B2* | 12/2003 | Fuller | H04B 10/5051 |
| | | | | 359/264 |
| 6,687,451 | B1* | 2/2004 | Sikora | G02F 1/0123 |
| | | | | 398/187 |
| 7,369,290 | B1* | 5/2008 | Cox | G02F 1/0123 |
| | | | | 359/238 |
| 7,715,732 | B2* | 5/2010 | Koh | G02F 1/0123 |
| | | | | 359/237 |
| 7,986,885 | B2* | 7/2011 | Mamyshev | G02F 1/0123 |
| | | | | 398/188 |
| 8,620,115 | B2* | 12/2013 | Webster | G02F 1/2257 |
| | | | | 385/1 |
| 8,670,676 | B2* | 3/2014 | Oberland | G02F 1/0123 |
| | | | | 398/195 |
| 9,128,308 | B1* | 9/2015 | Zortman | G02F 1/025 |
| 9,454,059 | B1 | 9/2016 | Nagarajan | |
| 9,705,603 | B1* | 7/2017 | Abbas | G02F 1/0123 |
| 2003/0112487 | A1* | 6/2003 | Fuller | H04B 10/5051 |
| | | | | 359/239 |
| 2005/0147136 | A1* | 7/2005 | Pobanz | G02F 1/0121 |
| | | | | 372/26 |
| 2006/0067708 | A1 | 3/2006 | Keil et al. | |
| 2007/0047954 | A1* | 3/2007 | Mamyshev | G02F 1/0123 |
| | | | | 398/33 |
| 2008/0088354 | A1* | 4/2008 | Mosinskis | G02F 1/2255 |
| | | | | 327/361 |
| 2008/0094123 | A1* | 4/2008 | Koh | G02F 1/0123 |
| | | | | 327/513 |
| 2008/0304598 | A1* | 12/2008 | Yan | H04L 27/2096 |
| | | | | 375/329 |
| 2009/0074419 | A1* | 3/2009 | Pappert | H04B 10/25137 |
| | | | | 398/91 |
| 2012/0033964 | A1* | 2/2012 | Mamyshev | G02F 1/0123 |
| | | | | 398/25 |
| 2012/0251104 | A1* | 10/2012 | Oberland | G02F 1/0123 |
| | | | | 398/38 |
| 2016/0363835 | A1 | 12/2016 | Nagarajan | |
| 2017/0023805 | A1* | 1/2017 | Pobanz | H04B 10/25 |
| 2017/0134095 | A1* | 5/2017 | Nagarajan | H03M 1/682 |
| 2018/0321520 | A1 | 11/2018 | El-Moznine et al. | |
| 2019/0137842 | A1 | 5/2019 | Islam et al. | |

OTHER PUBLICATIONS

Gill et al., Demonstration of a High Extinction Ratio Monolithic CMOS Integrated Nanophotonic Transmitter and 16 Gb/s Optical Link, IEEE Journal of Selected Topics in Quantum Electronics, vol. 21, No. 4, Jul./Aug. 2015 (Year: 2015).*

Zortman et al., "Low-voltage differentially-signaled modulators," Opt. Express 19, 26017-26026 (2011) (Year: 2011).*

Chao et al., "Forward bias operation of silicon photonic Mach Zehnder modulators for RF applications," Opt. Express 25, 23181-23190 (2017) (Year: 2017).*

M.V. Raghavendra, et al., "Driver circuit implementation for source in optical communication-a review", Indian Journal of Science and Technology, vol. 3, No. 7, ISSN: 0974-6846, Jul. 2010, 6 pages.

D.M. Gill, et al., "Monolithic Travelling-Wave Mach-Zehnder Transmitter with High-Swing Stacked CMOS Driver", CLEO: Science and Innovations 2014, Jun. 2014, ISBN: 978-1-55752-999-2, OSA Technical Digest, Optical Society of America, paper SM2G.3, https://doi.org/10.1364/CLEO_SI.2014.SM2G.3, 2 pages.

Volkan Kursun, et al., "Cascode Buffer for Monolithic Voltage Conversion Operating at High Input Supply Voltages", 2005 IEEE International Symposium on Circuits and Systems, Kobe, Japan, May 23-26, 2005, DOI: 10.1109/ISCAS.2005.1464625, 4 pages.

NeoPhotonics, "64 Gbaud Coherent Driver Modulator CDM", retrieved from Internet Jun. 9, 2020, 5 pages; https://www.neophotonics.com/products/64-gbaud-coherent-driver-modulator/.

Daniel Mahgerefteh et al., "Techno-Economic Comparison of Silicon Photonics and Multimode VCSELs", Journal of Lightwave Technology, Sep. 11, 2015, 20 pages.

Texas Instruments, "DACx1416 Delivers Optimized Solution to Mach-Zehnder Modulator Biasing in Both Ratio- and Dither-type Circuits", SLAA841—Jun. 2018, 3 pages.

Texas Instruments, "ONET1131EC Externally Modulated Laser Driver With Integrated Clock and Data Recovery (CDR)", ONET1131EC, Sep. 2016, 50 pages.

Lumentum Operations LLC, "High Bandwidth Coherent Driver Modulator", retrieved from Internet Jun. 9, 2020, 3 pages; https://www.lumentum.com/en/products/high-bandwidth-coherent-driver-modulator.

* cited by examiner

HIGH SWING AC-COUPLED MACH-ZEHNDER INTERFEROMETER (MZI) DRIVER

TECHNICAL FIELD

The present disclosure relates to optical communications.

BACKGROUND

Mach-Zehnder Interferometer (MZI) modulators are used in optical networking/communications to modulate light for transmission over a fiber. MZI modulators in general exhibit a higher optical modulation amplitude (OMA) as the voltage swing increases (for a given modulator length). A figure of merit (FOM) of a MZI modulator is the product of voltage swing (V*pi) and length (L*pi) to produce a phase shift of pi radians. A higher OMA results in a larger optical signal improving the link performance.

The voltage swing across the modulator is limited by the maximum allowable voltage across the transistors in the companion electrical (driver) chip. Modern nanometer Complementary Metal Oxide Silicon (CMOS) processes have a supply voltage limit of 1V or less typically.

DESCRIPTION OF EXAMPLE EMBODIMENTS

Overview

Presented herein are circuit arrangements and methods to increase the swing of an MZI modulator without increasing the supply voltage of the electrical integrated circuit. According to one embodiment, a driver circuit is provided that includes a first driver having an input to receive one of an input data or input data complement, and an output to be coupled to a first application voltage node associated with a first arm of a Mach-Zehnder modulator. The driver circuit includes a second driver having an input to receive the other of the (input data complement or input data), and an output to be coupled to a second application voltage node associated with the first arm of the Mach-Zehnder modulator. A supply voltage is coupled to the first driver and to the second driver. A first coupling capacitor is connected between the output of the first driver and the first application voltage node. A first bias voltage is provided that is connected via a first bias resistor to the first application voltage node. The first driver and the second driver differentially drive the first and second application voltage nodes associated with the first arm of the Mach-Zehnder modulator to result in a voltage swing associated with a voltage applied to the first arm that is twice the supply voltage. A similar arrangement may be provided for the second arm of the Mach-Zehnder modulator.

Example Embodiments

Mach-Zehnder Interferometer (MZI) modulators in general exhibit higher optical modulation amplitude (OMA) for larger voltage swing for a given modulator length. Modern nano-meter Complementary Metal-Oxide Semiconductor (CMOS) processes have a supply voltage limit of 1V or less. A conventional approach to obtain higher voltage swing is to stack devices to sustain a higher supply voltage (higher than the technology limit) so that the voltage across any two terminals of a transistor is less than the technology limit. Presented herein are methods to increase the swing of the MZI modulator without increasing the supply voltage of the electrical integrated circuit chip.

An MZI modulator can be modeled as a lumped capacitor, denoted SISCAP. Conventionally, only one plate of the modulator is driven by an inverter-based CMOS driver or a linear driver. The other plate is held at a DC voltage, denoted VPOLY. For Intensity Modulated (IM) transmitters, VPOLY is chosen such that the phase shift is maximum for a given voltage swing.

According to the techniques presented herein, the swing across SISCAP can be increased to twice the supply voltage (Vdd) by driving both plates of the modulator differentially. This increases the phase change per unit length of the MZI modulator.

Figure 1:
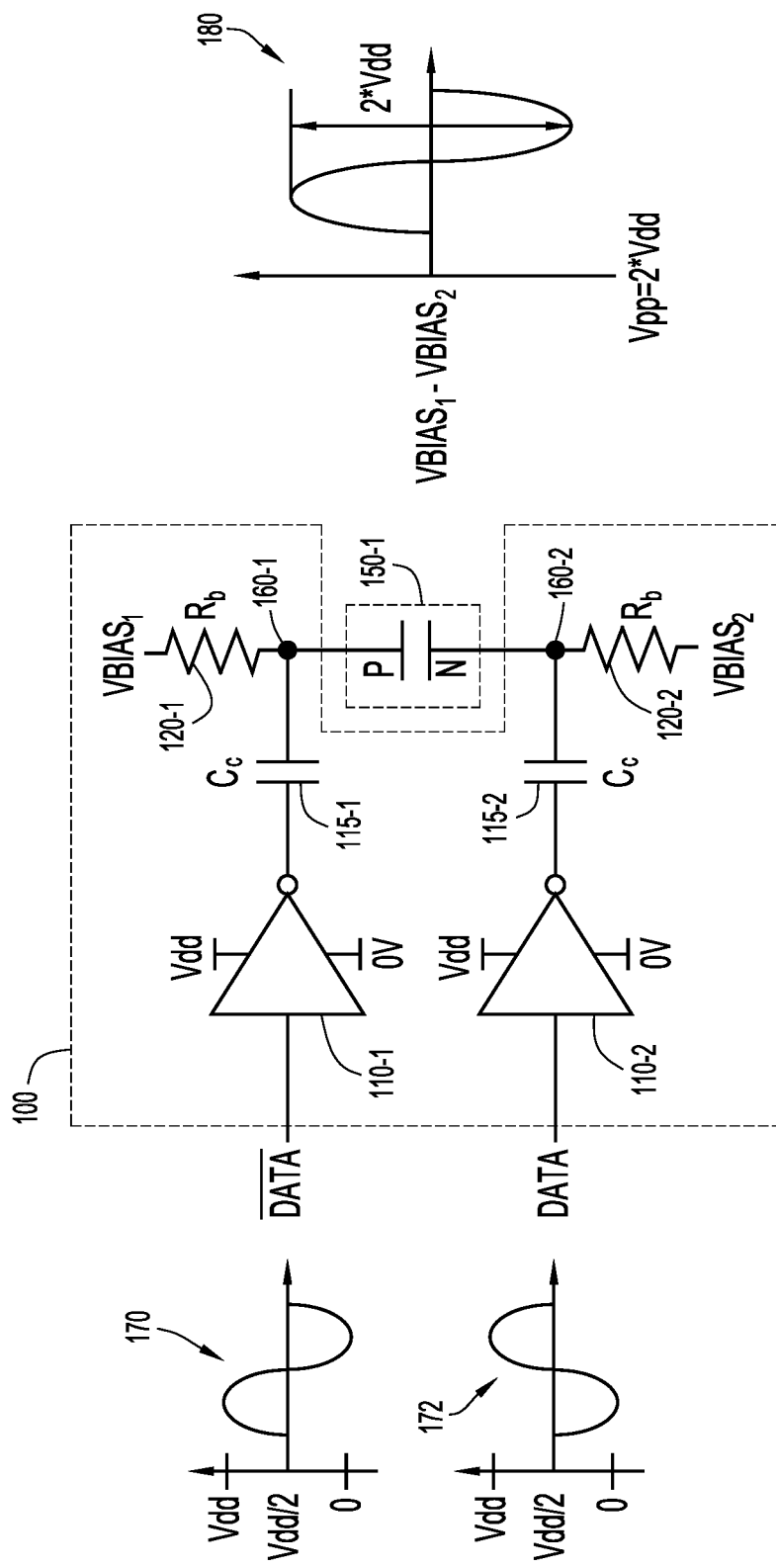
FIG. 1 is a schematic diagram showing a driver circuit for a Mach-Zehnder modulator according to a first example embodiment.

Referring first to FIG. 1, a driver circuit 100 for an MZI modulator according to one embodiment is shown. The driver circuit 100 includes two inverter-based CMOS drivers (or linear drivers) 110-1 and 110-2, AC coupling capacitors $C_c$ shown at 115-1 and 115-2, bias voltages $VBIAS_1$ and $VBIAS_2$, and bias resistors (Rb) 120-1 and 120-2. The drivers 110-1 and 110-2 are configured to receive input data to be modulated, where driver 110-1 receives data complement (DATA bar) and driver 110-2 receives data (DATA). Each driver 110-1 and 110-2 is coupled to a supply voltage Vdd. In general, the first driver 110-1 may receive one of data (DATA) or data complement (DATA bar), and the second driver 110-2 may receive the other of data complement (DATA bar) or data (DATA).

For simplicity, FIG. 1 shows one arm of an MZI modulator (shown as a lumped capacitor, SISCAP, 150-1) and how the driver circuit 100 drives the application voltage nodes or plates for the arm. More specifically, there is a first (positive) application voltage node 160-1 and a second (negative) application voltage node 160-2. It is understood that the MZI modulator includes another arm that is driven in a similar manner, as will become apparent from the description below.

The output of driver 110-1 is connected to AC coupling capacitor 115-1 which in turn is connected to the first application voltage node 160-1. Similarly, the output of driver 110-2 is connected to AC coupling capacitor 115-2 which in turn is connected to the second application voltage node 160-2. A similar driver arrangement is provided for the other arm (not shown in FIG. 1).

Figure 2:
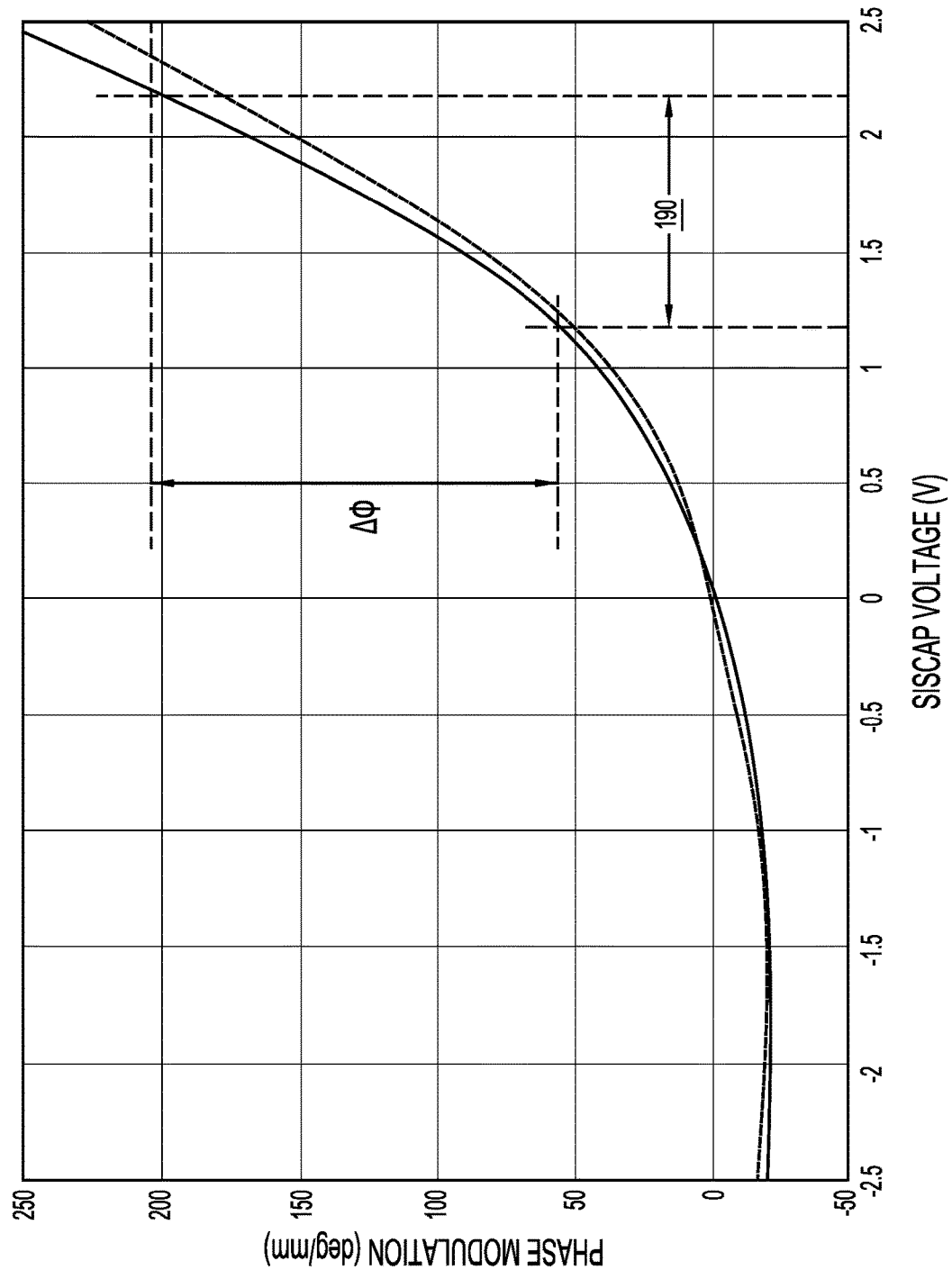
FIG. 2 is a plot of voltage versus phase modulation and showing how the driver circuit according to the embodiments presented herein achieve operation in a higher slope region of the voltage versus phase modulation curve.

FIG. 1 shows at 170 the voltage waveform associated with driver 110-1 and at 172 the voltage waveform associated with driver 110-2. FIG. 1 also shows at 180 that the voltage waveform resulting from differentially driving an arm of the MZI modulator increases the voltage swing across the SISCAP 150-1 to 2*Vdd. Thus, with reference to FIG. 2 and continued reference to FIG. 7, the use of AC coupling capacitors, and a suitable VBIAS=VBIAS1−VBIAS2, the biasing of the MZI modulator can be shifted to the higher slope region, shown at 190 in FIG. 2 to obtain higher phase modulation per unit length of the MZI modulator.

Figure 3:
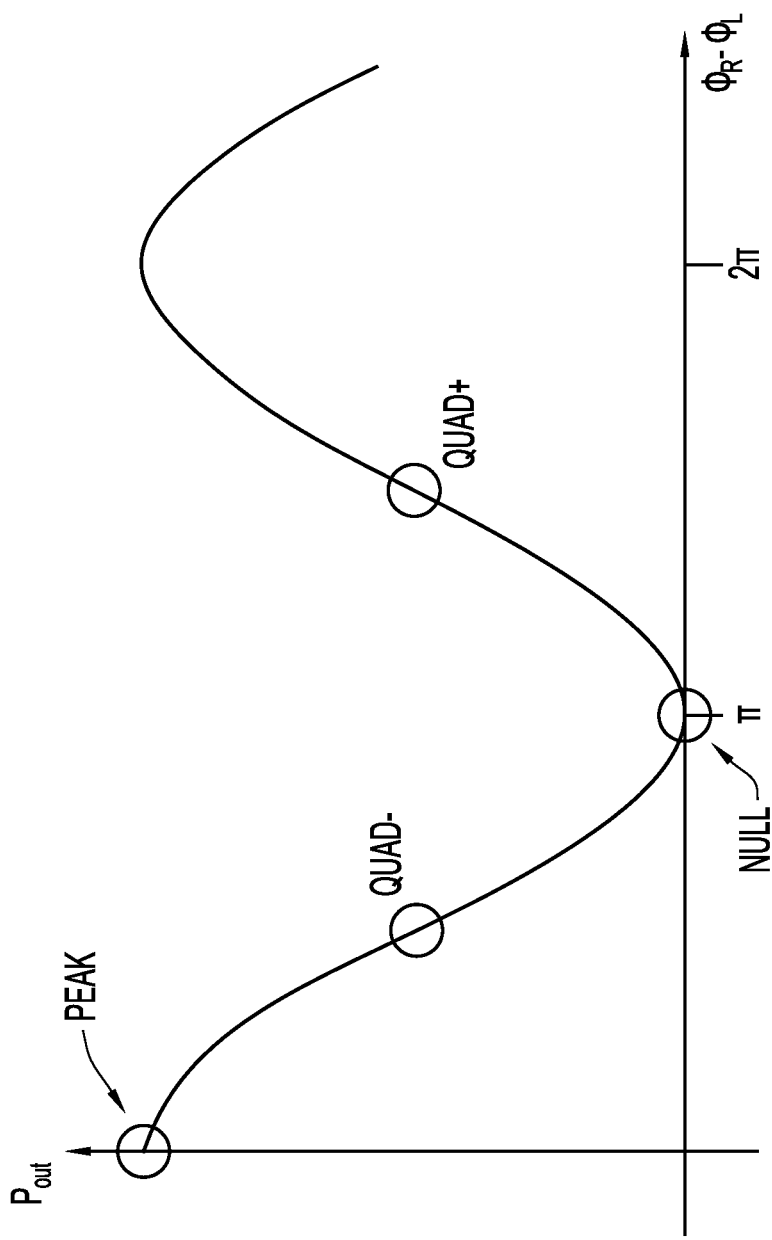
FIG. 3 is a plot showing how the modulator arms according to the embodiments presented herein can be optically biased at a null point or a quadrature point.

With reference to FIG. 3, for intensity modulation, optical biasing in the modulator is made at a quadrature point. For a coherent scheme, optical biasing in the modulator is made at a null point.

Figure 4:
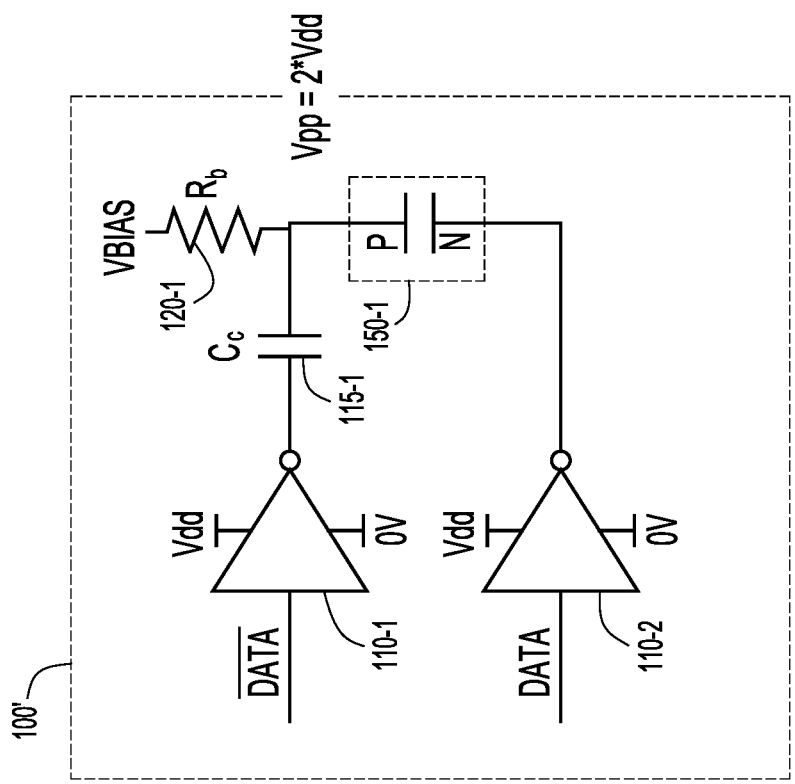
FIG. 4 is a schematic diagram showing a driver circuit for a Mach-Zehnder modulator, according to second example embodiment.

Reference is now made to FIG. 4. FIG. 4 shows a driver circuit 100' that is simplified version of the driver circuit configuration 100 shown in FIG. 1. The average value of the signal at the bottom plate of SISCAP 150-1 is Vdd/2. Using this average value, VBIAS1 can be adjusted to bias the modulator at any desired biasing point. Thus, only a single bias voltage, VBIAS, is needed that is connected through bias resistor 120-1. In addition, it is not necessary to AC couple the bottom (negative) plate of the SISCAP 150-1 to the driver 110-2, thus saving on the area of the AC coupling capacitor and any associated signal attenuation.

Figure 5:
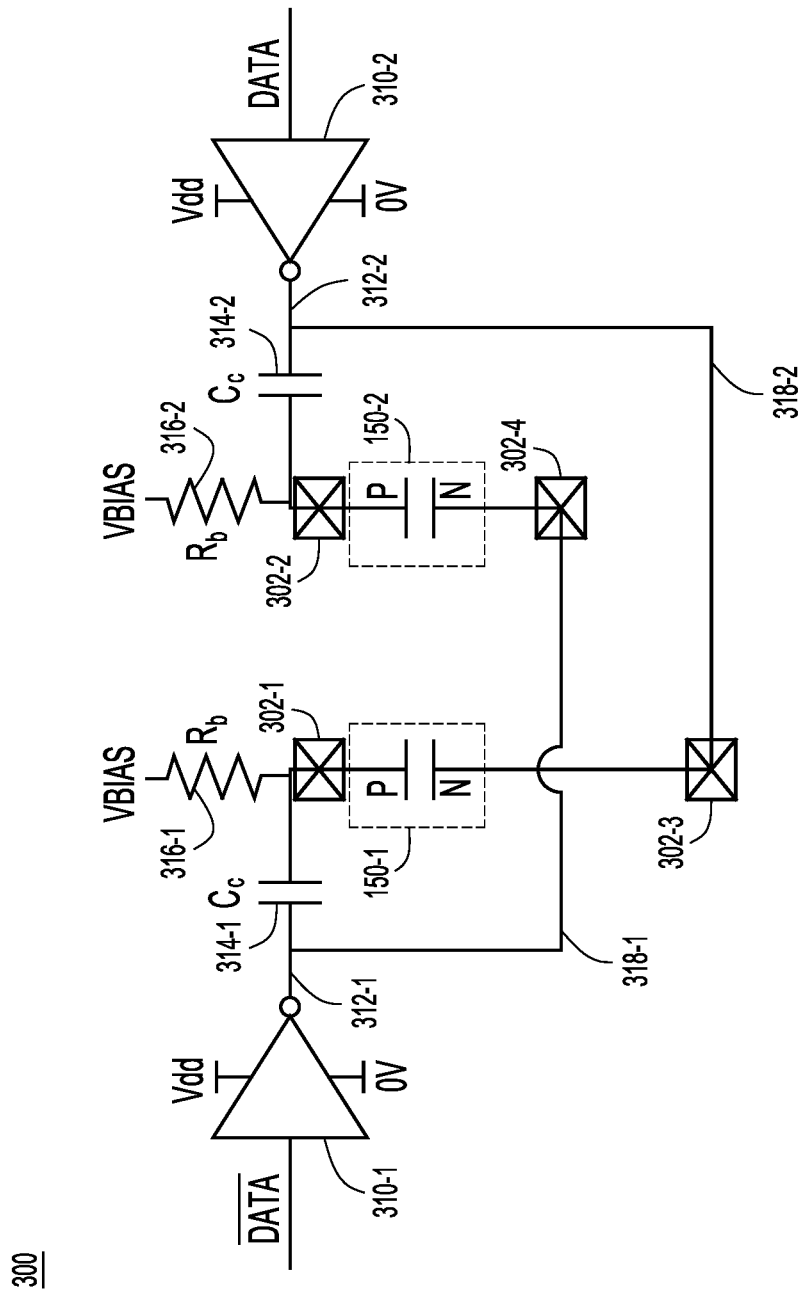
FIG. 5 is a schematic diagram showing one layout arrangement for the driver circuit shown in FIG. 4, according to an example embodiment.

Reference is now made to FIG. 5 that shows a block diagram in which two pinouts or bumps (denoted as ☒ ) from the driver circuit are provided for each arm of the MZI modulator. This results in a total of four pinouts (for both arms of the MZI modulator) from an integrated circuit (IC) dedicated to electrical domain signal processing (called "electrical IC") to the IC dedicated to optical domain signal processing (called "optical IC") and on which the MZI modulator resides. Specifically, FIG. 5 shows the connectivity of the driver circuit 300 to the application voltage node for each driver arm of a MZI modulator, where the first arm of the MZI modulator is represented by SISCAP 150-1 and a second arm of the MZI modulator is represented by SISCAP 150-2. In the embodiment of FIG. 5, the first and second drivers 310-1 and 310-2, coupling capacitors, 314-1 and 314-2 and the bias resistors 316-1 and 316-2 reside on an electrical IC. The four IC pinouts are shown at 302-1, 302-2, 302-3 and 302-4. The IC pinouts 302-1 and 302-2 are connected to the positive plates/node of the SISCAPs 150-1 and 150-2, respectively. The IC pinouts 302-3 and 302-4 are connected to the negative plates/nodes of the SISCAPs 150-1 and 150-2, respectively.

The driver circuit 300 takes the form of that shown in FIG. 5 for each SISCAP 150-1 and 150-2, but there is some sharing of the output of the drivers. Specifically, the driver circuit 300 includes the first driver 310-1 and the second driver 310-2. An input of driver 310-1 is connected to receive input data complement (DATA bar) and an input of driver 310-2 is connected to receive input data (DATA). An output 312-1 of driver 310-1 is connected to AC coupling capacitor ($C_C$) 314-1 and an output 312-2 of driver 310-2 is connected to AC coupling capacitor 314-2. The coupling capacitor 314-1 is connected to one terminal of bias resistor (Rb) 316-1, which is connected to the IC pinout 302-1. The bias voltage VBIAS is connected to the other terminal of bias resistor 316-1. Similarly, the coupling capacitor 314-2 is connected to one terminal of bias resistor 316-2, which is connected to the IC pinout 302-2. The bias voltage VBIAS is connected to the other terminal of bias resistor 316-2.

The output 312-1 of driver 310-1 is also connected, by connection 318-1, to the IC pinout 302-4, which as described above, is connected to the negative plate of SISCAP 150-2. Similarly, the output 312-2 of driver 310-2 is also connected, by connection 318-2, to the IC pinout 302-3, which is connected to the negative plate of SISCAP 150-1.

Figure 6:
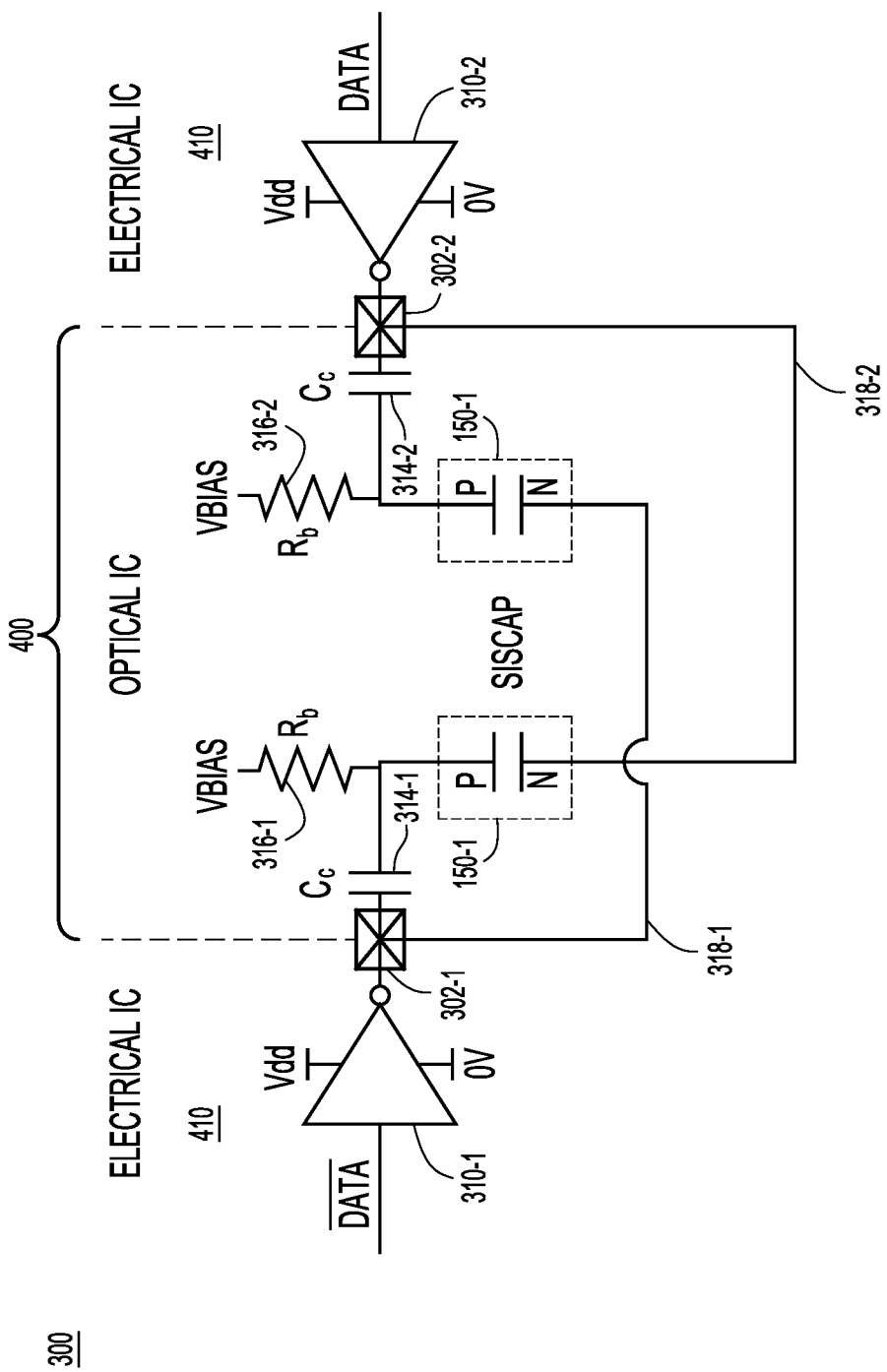
FIG. 6 is a schematic diagram showing another layout arrangement for the driver circuit shown in FIG. 4, according to an example embodiment.

Reference is now made to FIG. 6. FIG. 6 shows an arrangement of a driver circuit 300 in which the coupling capacitors 314-1 and 314-2, bias resistors 316-1 and 316-2 and bias voltage VBIAS are all implemented on the optical IC, shown at 400. As a result, fewer pinouts are used between the electrical IC, shown at 410, and the optical IC 400. Specifically, the arrangement shown in FIG. 6 has only two pinouts 302-1 and 302-2. This reduces pinouts of high-speed signals. The optical IC 400 does not have a ground plane and therefore any parasitic capacitance associated with the coupling capacitors 314-1 and 314-2, as well as any signal attenuation, is minimized. Higher sheet resistivity material is available on the optical IC 400, and this makes the bias resistors 316-1 and 316-2 very compact.

Figure 7:
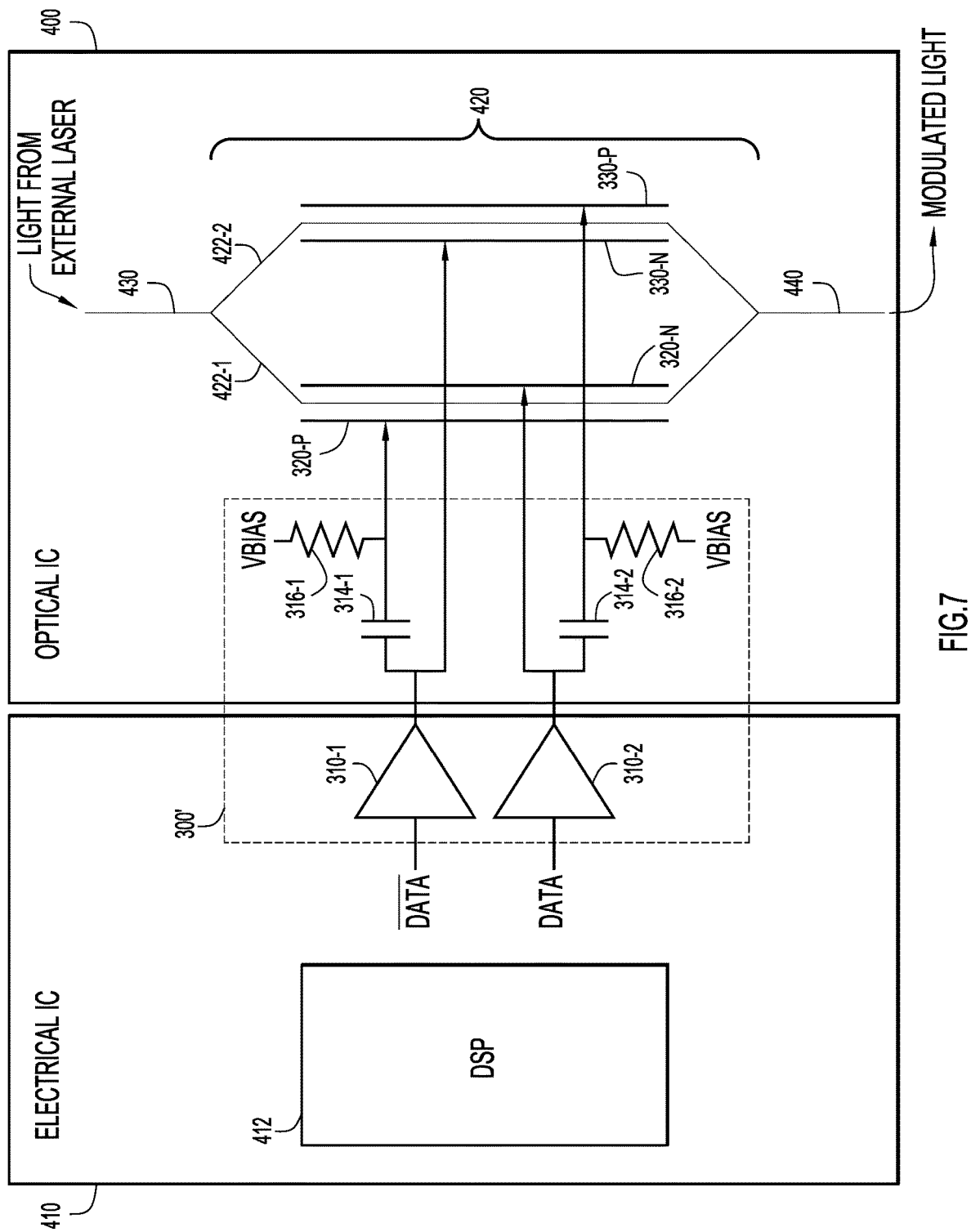
FIG. 7 is a schematic diagram showing a driver circuit, based on concepts depicted in the embodiments of FIGS. 4 and 6, connected to a Mach-Zehnder modulator, according to an example embodiment.

Reference is now made to FIG. 7. FIG. 7 shows how the driver circuit according to the embodiments presented herein may be deployed in connection with both arms of a MZI modulator deployed on an optical IC. FIG. 7 shows driver circuit 300', the optical IC 400, the electrical IC 410 and the MZI modulator 420 on the optical IC 400. The MZI modulator 420 shown in FIG. 7 includes arms 422-1 and 422-2. The driver circuit 300' generates a differential application voltage to each arm 422-1 and 422-2 of the Mach-Zehnder modulator 420. First and second application voltage nodes 320-P and 320-N, respectively, are associated with, and apply an application voltage to, arm 422-1, and first and second application voltage nodes 330-P and 330-N, respectively, are associated with, and apply an application voltage to, arm 422-2.

The driver 310-1 applies the output associated with DATA bar, via AC coupling capacitor 314-1, to plate 320-P and driver 310-2 applies the output associated with DATA, without an AC coupling capacitor, to plate 320-N. Similarly, driver 310-1 applies the output associated with DATA bar, without an AC coupling capacitor, to plate 330-N and driver 310-2 applies the output associated with data, via AC coupling capacitor 314-2 to plate 330-P.

In operation, light from an external laser enters the MZI modulator 420 at 430, is split into the arms 422-1 and 422-2. The light passing through each arm 422-1 and 422-2 is modulated according to the application voltage applied between application voltage node 320-P and 320-N to the arm 422-1 and the application voltage applied between application voltage nodes 330-P and 330-N to arm 422-2. The resulting modulated light in each arm 422-1 and 422-2 is combined and output at 440 from the MZI modulator 420.

The bump connections from the electrical driver IC 410 to the optical IC 400 remain the same as for a conventional driver. The area overhead for the extra coupling capacitors is minimal. Thus, the embodiments presented herein have no layout area overhead in implementation.

Figure 8:
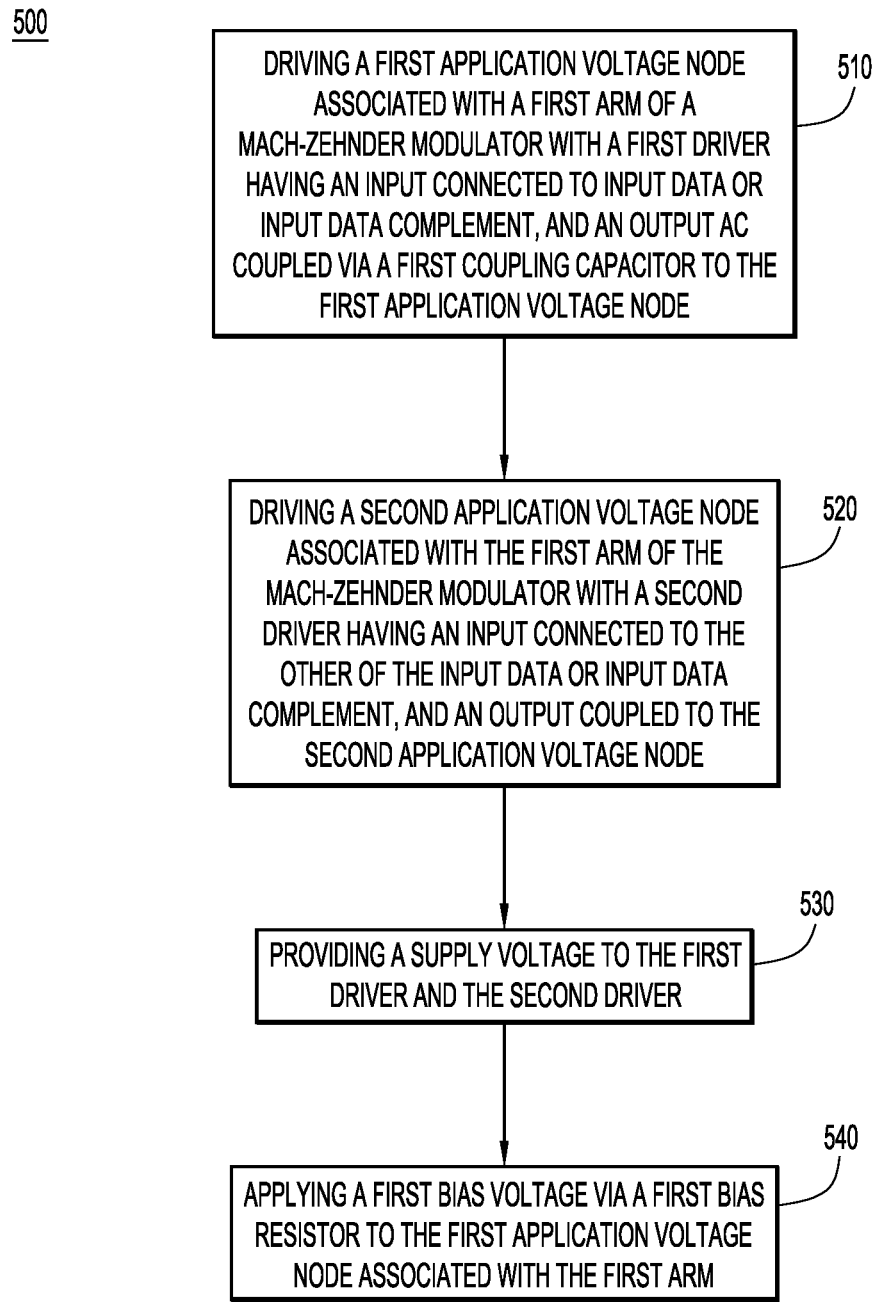
FIG. 8 is a flow chart depicting a method for driving a Mach-Zehnder modulator, according to an example embodiment.

Reference is now made to FIG. 8. FIG. 8 is a flow chart of a method 500 to drive a MZI modulator according to an example embodiment. It should be appreciated by one of ordinary skill in the art, that the operations of method 500 are not necessarily sequentially performed. Some steps may be performed simultaneously. At 510, a first application voltage node associated with a first arm of a Mach-Zehnder modulator is driven with a first driver having an input connected to input data or input data complement, and an output AC coupled via a first coupling capacitor to the first application voltage node. At 520, a second application voltage node associated with the first arm of the Mach-Zehnder modulator is driven with a second driver having an input connected to the other of the input data complement or input data, and an output coupled to the second application voltage node. At 530, a supply voltage is provided to the first driver and to the second driver. At 540, a first bias voltage is applied via a first bias resistor to the first application voltage node associated with the first arm. As a result of the operations of method 500, the first driver and the second driver differentially drive the first and second application voltage nodes associated with the first arm of the Mach-Zehnder modulator to result in a voltage swing associated with a voltage applied to the first arm that is twice the supply voltage.

A similar process would be performed with respect to the second arm of the Mach-Zehnder modulator. That is, a second application voltage associated with a second arm of the Mach-Zehnder modulator is driven with the output of the first driver. A first application voltage node associated with the second arm of the Mach-Zehnder modulator is driven with the output of the second driver that is AC coupled via a second coupling capacitor to the first application voltage node associated with the second arm. A second bias voltage is applied via a second bias resistor to the first application voltage node associated with the second arm. As a result, the first driver and the second driver differentially drive the first and second application voltage nodes associated with the second arm of the Mach-Zehnder modulator to result in a voltage swing associated with a voltage applied to the second arm that is twice the supply voltage.

Table T1 below shows a comparison of simulated rise/fall time for 3 driver architectures and an architecture employing the techniques presented herein) with a constant load and equal power consumption.

TABLE T1

Performance Comparison

| Driver Topology | Rise Time (ps) | Fall Time (ps) |
|---|---|---|
| Conventional Stacked Driver (type 1) | 20.57 | 20.08 |
| Conventional Stacked Driver (type 2) | 18.50 | 18.01 |
| AC coupled driver of these embodiments | 15.04 | 15.33 |

Cascode devices of the conventional stacked drivers (type 1 and type 2) slow down the voltage transitions at the output. These devices are not present in the AC coupled driver embodiments presented herein, and hence, the AC coupled driver of these embodiments achieve shorter rise/fall times.

To summarize, a differentially driven MZI modulator is provided. The voltage swing across the MZI modulator is twice that of a conventionally driven modulator. Prior art driver circuit designs use stacked devices to increase the voltage swing beyond that supported by the electrical IC. Even a very carefully designed structure has reliability issues as the voltage excursions during switching exceed the rated limits for the technology/process. Cascode devices used in conventional stacked designs slow down the voltage transitions as well as dissipate power that is not delivered to the modulator. The driver circuit arrangements presented herein are particularly suitable for modern fine-line nanometer CMOS processes, where the supply voltage is dropping in successive generations. The driver circuit presented herein is attractive for coherent optics also where the modulator may be optically biased at the peak or null operating points. This driver circuit design may be particularly useful in higher symbol-rate systems, e.g., 100 GBd per wavelength.

A higher drive voltage (2*Vdd) to the MZI modulator results in a higher OMA. Conversely, for a given OMA, the modulator length can be reduced. In addition, a reduction in rise/fall times is achieved due to reduction of load capacitance. Again, a smaller rise/fall time translates to a higher symbol rate/bandwidth. This makes the designs providing a higher drive voltage to the optical modulator particularly useful for higher baud-rate per wavelength systems.

Increasing the voltage swing increases constellation spacing, and this is desirable for certain modulation schemes. Error vector magnitude (EVM) is the figure of merit for coherent systems. EVM depends on the spacing between constellation points, which may be increased with a higher OMA from the individual modulators (I & Q branches) using the techniques presented herein.

Moreover, there are no reliability issues associated with the driver circuit embodiments presented herein, unlike that of the prior art stacked drivers. For a given power dissipation, the AC coupled driver arrangements presented herein will have a lower rise/fall time compared to the prior art stacked driver arrangements.

Layout and Other Considerations

The coupling capacitor and the SISCAP form a voltage divider. Increasing the value of the coupling capacitor reduces the loss. In one form, the coupling capacitor may be 10 times the value of the SISCAP. The total value of the capacitance may be split to cater to layout placement and to optimize area.

While the foregoing presents embodiments that can achieve 2*Vdd voltage swing, this not meant to be limiting. For example, it is possible to achieve more than 2*Vdd voltage swing. For example, for a 4*Vdd voltage swing, using the AC coupling techniques presented herein, two stacked devices could be used for a 2*Vdd swing on each plate and a total of 4*Vdd swing across the SISCAP. Driving both plates of the SISCAP enables reducing the number of series devices used in conventional designs by half. This reduces the voltage drop across the cascode devices providing faster rise and fall times. This also reduces the voltage stress on the devices during the voltage transients.

In summary, in one embodiment, an apparatus is provided that comprises a first driver having an input to receive one of an input data or input data complement, and an output to be coupled to a first application voltage node associated with a first arm of a Mach-Zehnder modulator; a second driver having an input to receive the other of the input data complement or input data, and an output to be coupled to a second application voltage node associated with the first arm of the Mach-Zehnder modulator; a supply voltage coupled to the first driver and to the second driver; a first coupling capacitor connected between the output of the first driver and the first application voltage node; a first bias voltage; and a first bias resistor connected between the first bias voltage and the first application voltage node; wherein the first driver and the second driver differentially drive the first and second application voltage nodes associated with the first arm of the Mach-Zehnder modulator to result in a voltage swing associated with a voltage applied to the first arm that is twice the supply voltage.

The output of the second driver may be connected directly to the second application voltage node associated with the first arm of the Mach-Zehnder modulator and the output of the first driver may be connected directly to the second application voltage node associated with the second arm of the Mach-Zehnder modulator.

In one variation, the first coupling capacitor and the first bias resistor are implemented on an integrated circuit separate from an integrated circuit on which the Mach-Zehnder modulator is implemented. In another variation, the first coupling capacitor and the first bias resistor are implemented on a same integrated circuit as the Mach-Zehnder modulator.

In still another form, the apparatus includes a second coupling capacitor connected between an output of the second driver and the second application voltage node; a second bias voltage; and a second bias resistor connected between second bias voltage and the second application voltage node.

In one variation, the output of the first driver is connected to a second application voltage node associated with a second arm of the Mach-Zehnder modulator, and the output of the second driver is configured to be coupled, by a second coupling capacitor, to a first application voltage node associated with the second arm of the Mach-Zehnder modulator, and the apparatus further includes: a second bias resistor connected between the first bias voltage and the first application voltage node associated with the second arm of the Mach-Zehnder modulator; and wherein the first driver and the second driver differentially drive the first and second application voltage nodes associated with the second arm of the Mach-Zehnder modulator to result in a voltage swing associated with a voltage applied to the second arm that is twice the supply voltage.

Again, the first coupling capacitor, the first bias resistor, the second coupling capacitor and the second bias resistor are implemented on an integrated circuit separate from an integrated circuit on which the Mach-Zehnder modulator is implemented, or the first coupling capacitor, the first bias resistor, the second coupling capacitor and the second bias resistor are implemented on a same integrated circuit as the Mach-Zehnder modulator.

The first and second drivers may be inverter-based Complementary Metal-Oxide Semiconductor (CMOS) drivers. The drivers could also be linear drivers providing complementary outputs.

Furthermore, the first bias voltage may be adjusted to bias the modulator in the higher slope region to obtain higher phase modulation.

In accordance with another embodiment, an apparatus is provided comprising: a first driver having an input and an output, wherein the input of the first driver is configured to receive input data complement; a second driver having an input and an output, wherein the input of the second driver is configured to receive the input data; a supply voltage coupled to the first driver and the second driver; first and second application voltage nodes associated with a first arm of a Mach-Zehnder modulator; first and second application voltage nodes associated with a second arm of the Mach-Zehnder modulator; a first coupling capacitor connected between the output of the first driver and the first application voltage node associated with the first arm; a second coupling capacitor connected between the output of the second driver and the first application voltage node of the second arm; the output of the second driver being connected to the second application voltage node associated with the first arm; the output of the first driver being connected to the second application voltage node associated with the second arm; a bias voltage connected via a first bias resistor to the first application voltage node associated with the first arm, the bias voltage connected via a second bias resistor to the second application voltage node associated with the second arm; wherein the first and second drivers differentially drive the first and second application voltage nodes associated with each of the first arm and the second arm of the Mach-Zehnder modulator to result in a voltage swing at the first and second application voltage nodes of the first and second arms that is twice the supply voltage.

In still another form, a method is provided including: driving a first application voltage node associated with a first arm of a Mach-Zehnder modulator with a first driver having an input connected to input data or input data complement, and an output AC coupled via a first coupling capacitor to the first application voltage node; driving a second application voltage node associated with the first arm of the Mach-Zehnder modulator with a second driver having an input connected to the other of the input data complement or input data, and an output coupled to the second application voltage node; providing a supply voltage to the first driver and to the second driver; applying a first bias voltage via a first bias resistor to the first application voltage node associated with the first arm; wherein the first driver and the second driver differentially drive the first and second application voltage nodes associated with the first arm of the Mach-Zehnder modulator to result in a voltage swing associated with a voltage applied to the first arm that is twice the supply voltage.

In one form, driving the second application voltage node includes directly connecting the output of the second driver to the second application voltage node associated with the first arm of the Mach-Zehnder modulator.

In one form, the method further includes: driving a second application voltage associated with a second arm of the Mach-Zehnder modulator with the output of the first driver; driving a first application voltage node associated with the second arm of the Mach-Zehnder modulator with the output of the second driver that is AC coupled via a second coupling capacitor to the first application voltage node associated with the second arm; applying the first bias voltage via a second bias resistor to the first application voltage node associated with the second arm; wherein the first driver and the second driver differentially drive the first and second application voltage nodes associated with the second arm of the Mach-Zehnder modulator to result in a voltage swing associated with a voltage applied to the second arm that is twice the supply voltage.

The method may further include adjusting the optical bias in the modulator at a null point for coherent modulation schemes, or adjusting the optical bias in the modulator at a quadrature point for intensity modulation schemes.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
   a first coupling capacitor;
   a first driver having an input to receive one of an input data or input data complement, and an output for coupling to, via the first coupling capacitor, a first application voltage node associated with a first plate of a first arm of a Mach-Zehnder modulator;

a second driver having an input to receive the other of the input data complement or input data, and an output for coupling at a second application voltage node associated with a second plate of the first arm of the Mach-Zehnder modulator;
a second coupling capacitor;
the second driver having the output for coupling to, via the second coupling capacitor, a first application voltage node associated with a first plate of a second arm of the Mach-Zehnder modulator;
the first driver having the output for coupling at a second application voltage node associated with a second plate of the second arm of the Mach-Zehnder modulator;
a supply voltage for coupling to the first driver and to the second driver;
a first bias resistor for coupling between a first bias voltage and the first application voltage node associated with the first plate of the first arm; and
a second bias resistor for coupling between a second bias voltage and the first application voltage node associated with the first plate of the second arm,
wherein the first driver and the second driver differentially drive the first and the second application voltage nodes associated with each of the first arm and the second arm of the Mach-Zehnder modulator to result in a voltage swing at the first and the second application voltage nodes of the first and the second arms that is twice the supply voltage.

2. The apparatus of claim 1, wherein the output of the first driver is for connecting directly to the second application voltage node associated with the second plate of the second arm of the Mach-Zehnder modulator, and wherein the output of the second driver is for connecting directly to the second application voltage node associated with the second plate of the first arm of the Mach-Zehnder modulator.

3. The apparatus of claim 1, wherein the first and the second drivers, the first and the second coupling capacitors, and the first and the second bias resistors are implemented on a first integrated circuit separate from a second integrated circuit on which the Mach-Zehnder modulator is implemented.

4. The apparatus of claim 1, wherein the first and the second drivers are implemented on a first integrated circuit, and wherein the first and the second coupling capacitors, the first and the second bias resistors, and the Mach-Zehnder modulator are implemented on a second integrated circuit separate from the first integrated circuit.

5. The apparatus of claim 3, wherein first and second pinouts of the first integrated circuit are for connecting to, respectively, the first and the second application voltage nodes associated with the first and the second plates of the first arm of the Mach-Zehnder modulator on the second integrated circuit, and wherein third and fourth pinouts of the first integrated circuit are for connecting to, respectively, the first and the second application voltage nodes associated with the first and the second plates of the second arm of the Mach-Zehnder modulator on the second integrated circuit.

6. The apparatus of claim 4, wherein the output of the first driver is provided at a first pinout of the first integrated circuit and the output of the second driver is provided at a second pinout of the first integrated circuit.

7. The apparatus of claim 1, wherein the first and second drivers are inverter-based Complementary Metal-Oxide Semiconductor (CMOS) drivers or linear drivers providing complementary outputs.

8. The apparatus of claim 6, wherein the first and the second pinouts of the first integrated circuit are provided for connecting to, respectively, first and second pinouts of the second integrated circuit.

9. An apparatus comprising:
a first driver having an input and an output, wherein the input of the first driver is configured to receive an input data complement;
a second driver having an input and an output, wherein the input of the second driver is configured to receive an input data;
a supply voltage coupled to the first driver and the second driver;
first and second application voltage nodes associated with first and second plates, respectively, of a first arm of a Mach-Zehnder modulator;
first and second application voltage nodes associated with first and second plates, respectively, of a second arm of the Mach-Zehnder modulator;
a first coupling capacitor for coupling between the output of the first driver and the first application voltage node associated with the first plate of the first arm;
a second coupling capacitor for coupling between the output of the second driver and the first application voltage node associated with the first plate of the second arm;
the output of the second driver for coupling at the second application voltage node associated with the second plate of the first arm;
the output of the first driver to for coupling at the second application voltage node associated with the second plate of the second arm;
a first bias resistor for coupling between a bias voltage and the first application voltage node associated with the first plate of the first arm, and a second bias resistor for coupling between the bias voltage and the second application voltage node associated with the second plate of the second arm; and
wherein the first and the second drivers differentially drive the first and the second application voltage nodes associated with each of the first arm and the second arm of the Mach-Zehnder modulator to result in a voltage swing at the first and second application voltage nodes of the first and second arms that is twice the supply voltage.

10. The apparatus of claim 9, wherein the first and the second drivers, the first and the second coupling capacitors, and the first and the second bias resistors are implemented on a first integrated circuit separate from a second integrated circuit on which the Mach-Zehnder modulator is implemented.

11. The apparatus of claim 9, wherein the first and the second drivers are implemented on a first integrated circuit, and wherein the first coupling capacitor, the first bias resistor, the second coupling capacitor, the second bias resistor, and the Mach-Zehnder modulator are implemented on a second integrated circuit separate from the first integrated circuit.

12. The apparatus of claim 10,
wherein the output of the first driver is provided at a first pinout of the first integrated circuit and the output of the second driver is provided at a second pinout of the first integrated circuit.

13. The apparatus of claim 11,
wherein first and second pinouts of the first integrated circuit are provided for connecting to, respectively, first and second pinouts of the second integrated circuit.

14. The apparatus of claim 9, wherein the first and second drivers are inverter-based Complementary Metal-Oxide Semiconductor (CMOS) drivers or linear drivers providing complementary outputs.

15. The apparatus of claim 9, wherein the bias voltage is adjusted to bias the Mach-Zehnder modulator in a higher slope region.

16. An apparatus comprising:
first driver means for driving a first application voltage node associated with a first plate of a first arm of a Mach-Zehnder modulator, the first driver means having an input connected to input data or input data complement, and an output that is AC coupled via a first coupling capacitor to the first application voltage node associated with the first plate of the first arm;
second driver means for driving a second application voltage node associated with a second plate of the first arm of the Mach-Zehnder modulator, the second driver means having an input connected to the other of the input data complement or input data, and an output for coupling at the second application voltage node associated with the second plate of the first arm;
the second driver means for further driving a first application voltage node associated with a first plate of a second arm of the Mach-Zehnder modulator, the second driver means having the output which is AC coupled via a second coupling capacitor to the first application voltage node associated with the first plate of the second arm;
the first driver means for further driving a second application voltage node associated with a second plate of the second arm of the Mach-Zehnder modulator, the first driver having the output for coupling at the second application voltage node associated with the second plate of the second arm;
supply voltage means for providing a supply voltage to the first driver means and to the second driver means;
bias voltage means for applying a bias voltage via a first bias resistor to the first application voltage node associated with the first plate of the first arm, and for applying the bias voltage via a second bias resistor to the first application voltage node associated with the first plate of the second arm; and
wherein the first driver means and the second driver means differentially drive the first and second application voltage nodes associated with each of the first arm and the second arm of the Mach-Zehnder modulator to result in a voltage swing at the first and the second application voltage nodes of the first and the second arms that is twice the supply voltage.

17. The apparatus of claim 16, wherein the output of the second driver means is directly connected to the second application voltage node associated with the second plate of the first arm of the Mach-Zehnder modulator.

18. The apparatus of claim 16, wherein:
the first and the second drivers, the first and the second coupling capacitors, and the first and the second bias resistors are implemented on a first integrated circuit separate from a second integrated circuit on which the Mach-Zehnder modulator is implemented, and
first and second pinouts of the first integrated circuit are for connecting to, respectively, the first and the second application voltage nodes associated with the first and the second plates of the first arm of the Mach-Zehnder modulator on the second integrated circuit, and third and fourth pinouts of the first integrated circuit are for connecting to, respectively, the first and the second application voltage nodes associated with the first and the second plates of the second arm of the Mach-Zehnder modulator on the second integrated circuit.

19. The apparatus of claim 16, wherein the bias voltage means is configured to adjust the bias voltage to bias the Mach-Zehnder modulator in a maximum slope region.

20. The apparatus of claim 16, wherein:
the first and the second drivers are implemented on a first integrated circuit, and wherein the first and the second coupling capacitors, the first and the second bias resistors, and the Mach-Zehnder modulator are implemented on a second integrated circuit separate from the first integrated circuit, and
the output of the first driver comprises a first pinout of the first integrated circuit and the output of the second driver comprises a second pinout of the first integrated circuit.

* * * * *